US010422503B2

(12) United States Patent
Raleigh et al.

(10) Patent No.: US 10,422,503 B2
(45) Date of Patent: Sep. 24, 2019

(54) ONE-PIECE MULTI-LENS OPTICAL MEMBER AND METHOD OF MANUFACTURE

(71) Applicant: Cree, Inc., Durham, NC (US)

(72) Inventors: Craig Raleigh, Racine, WI (US); Kurt S. Wilcox, Libertyville, IL (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 557 days.

(21) Appl. No.: 13/843,649

(22) Filed: Mar. 15, 2013

(65) Prior Publication Data

US 2014/0268761 A1 Sep. 18, 2014
US 2016/0153639 A9 Jun. 2, 2016

Related U.S. Application Data

(63) Continuation-in-part of application No. 13/441,571, filed on Apr. 6, 2012, now Pat. No. 9,404,634, which is a continuation-in-part of application No. 12/610,077, filed on Oct. 30, 2009, now Pat. No. 8,348,461.

(51) Int. Cl.
*F21V 5/00* (2018.01)
*F21V 5/04* (2006.01)
(Continued)

(52) U.S. Cl.
CPC ........ *F21V 5/007* (2013.01); *B29C 45/14467* (2013.01); *B29D 11/0073* (2013.01);
(Continued)

(58) Field of Classification Search
CPC ..... F21K 9/50; G02B 13/002; G02B 13/0035; G02B 13/0055; G02B 7/021; B29D 11/0073
(Continued)

(56) References Cited

U.S. PATENT DOCUMENTS 3,560,598 A 2/1971 Neefe
3,760,237 A 9/1973 Jaffe
(Continued)

FOREIGN PATENT DOCUMENTS

DE 202014100462 4/2014
EP 1657758 A2 5/2006
(Continued)

OTHER PUBLICATIONS

"Focus on Precision—Injection Molding Optical Components" by Michael Stricker, et al.; Translated from Kunststoffe Apr. 2009, pp. 30-34.
(Continued)

*Primary Examiner* — Zheng Song
(74) *Attorney, Agent, or Firm* — Jansson Munger McKinley & Kirby Ltd.

(57) ABSTRACT

A one-piece optical member with a plurality of secondary lenses over corresponding LED light sources, the one-piece optical member comprises (a) each with an outward lens flange surrounding a light-transmitting portion which is formed by a plurality of layers and has an asymmetric inner surface defining a pair of cavities with at least one of the plurality of layers at least partially extending between the pair of cavities, a portion of the inner-surface which defines one of the cavities is at least partially formed by another of the plurality of layers which is bonded to the at least one layer extending between the pair of cavities. The polymeric materials may be different; e.g., the innermost lens layer may be of an LSR material. The invention is also a method of manufacturing the one-piece optical member and an LED light fixture with the one-piece member over a plurality of LED light sources spaced on a circuit board.

27 Claims, 7 Drawing Sheets

(51) Int. Cl.
  *B29C 45/14* (2006.01)
  *B29D 11/00* (2006.01)
  *F21K 9/60* (2016.01)
  B29L 11/00 (2006.01)
  B29C 45/16 (2006.01)
  F21Y 105/10 (2016.01)
  F21Y 115/10 (2016.01)

(52) U.S. Cl.
  CPC ............... *F21K 9/60* (2016.08); *F21V 5/04* (2013.01); *B29C 45/1671* (2013.01); *B29L 2011/0016* (2013.01); *F21Y 2105/10* (2016.08); *F21Y 2115/10* (2016.08)

(58) Field of Classification Search
  USPC ............ 362/227–248, 268, 296.02, 326, 331
  See application file for complete search history.

(56) References Cited

U.S. PATENT DOCUMENTS

| | | | |
|---|---|---|---|
| 4,808,101 A | 2/1989 | Schad et al. | |
| 5,223,275 A | 6/1993 | Gellert | |
| 5,485,317 A * | 1/1996 | Perissinotto et al. | 359/712 |
| 5,494,615 A | 2/1996 | Wang Lee | |
| 5,836,676 A * | 11/1998 | Ando | G09F 9/33 |
| | | | 257/E25.02 |
| 5,954,423 A | 9/1999 | Logan et al. | |
| 6,123,889 A | 9/2000 | Katagiri et al. | |
| 6,395,201 B1 | 5/2002 | Hunt et al. | |
| 6,499,870 B1 | 12/2002 | Zwick et al. | |
| 6,502,956 B1 | 1/2003 | Wu | |
| 6,606,199 B2 | 8/2003 | Wang | |
| 6,636,363 B2 | 10/2003 | Kaminsky et al. | |
| 6,679,621 B2 | 1/2004 | West et al. | |
| 6,896,381 B2 | 5/2005 | Benitez et al. | |
| 6,942,360 B2 | 9/2005 | Chou et al. | |
| 7,056,567 B2 | 6/2006 | O'Neill et al. | |
| 7,152,985 B2 | 12/2006 | Benitez et al. | |
| 7,283,313 B2 | 10/2007 | Tamaoki | |
| 7,682,533 B2 | 3/2010 | Latan | |
| 7,682,853 B2 | 3/2010 | Ashida | |
| 7,696,527 B2 | 4/2010 | Uemoto | |
| 7,722,196 B2 | 5/2010 | Caire et al. | |
| 7,724,321 B2 | 5/2010 | Hsieh et al. | |
| 7,736,019 B2 | 6/2010 | Shimada et al. | |
| 7,906,892 B2 | 3/2011 | Choi et al. | |
| 7,918,590 B1 | 4/2011 | Li et al. | |
| 8,215,814 B2 | 7/2012 | Marcoux | |
| 8,235,547 B2 | 8/2012 | Hofmann | |
| 8,292,482 B2 | 10/2012 | Harbers et al. | |
| 8,294,165 B2 | 10/2012 | Hattori et al. | |
| 8,330,176 B2 | 12/2012 | Thompson et al. | |
| 8,348,461 B2 | 1/2013 | Wilcox et al. | |
| 8,419,219 B2 | 4/2013 | Yamamoto | |
| 8,434,912 B2 | 5/2013 | Holder | |
| 8,459,848 B2 | 6/2013 | Marley | |
| 8,545,049 B2 | 10/2013 | Davis et al. | |
| 8,602,605 B2 | 12/2013 | Park et al. | |
| 8,690,382 B2 | 4/2014 | Farmer | |
| 8,814,392 B1 | 8/2014 | Lipowsky et al. | |
| 8,820,963 B2 | 9/2014 | Olsen et al. | |
| 8,891,171 B2 | 11/2014 | Choquet | |
| 8,899,786 B1 | 12/2014 | Moghal | |
| 9,915,410 B2 | 3/2018 | York et al. | |
| 2002/0034081 A1 * | 3/2002 | Serizawa | 362/540 |
| 2003/0169504 A1 | 9/2003 | Kaminsky et al. | |
| 2003/0235050 A1 | 12/2003 | West et al. | |
| 2004/0161490 A1 | 8/2004 | Babin et al. | |
| 2004/0246606 A1 | 12/2004 | Benitez et al. | |
| 2005/0073840 A1 | 4/2005 | Chou et al. | |
| 2005/0093430 A1 | 5/2005 | Ibbetson et al. | |
| 2005/0168987 A1 | 8/2005 | Tamaoki et al. | |
| 2005/0184638 A1 | 8/2005 | Mueller et al. | |
| 2005/0231812 A1 | 10/2005 | Leu et al. | |
| 2006/0033431 A1 * | 2/2006 | Hsieh | F21V 5/00 |
| | | | 313/512 |
| 2006/0105485 A1 | 5/2006 | Basin et al. | |
| 2006/0252169 A1 | 11/2006 | Ashida | |
| 2007/0030675 A1 | 2/2007 | Oon et al. | |
| 2007/0201225 A1 * | 8/2007 | Holder | F21K 9/00 |
| | | | 362/227 |
| 2008/0079182 A1 | 4/2008 | Thompson et al. | |
| 2008/0084693 A1 | 4/2008 | Shimada et al. | |
| 2008/0151550 A1 | 6/2008 | Liu et al. | |
| 2008/0169523 A1 | 7/2008 | Vigier-Blanc et al. | |
| 2008/0198604 A1 * | 8/2008 | Kim | F21V 5/008 |
| | | | 362/293 |
| 2008/0203415 A1 | 8/2008 | Thompson et al. | |
| 2008/0273325 A1 * | 11/2008 | Wilcox | F21V 5/007 |
| | | | 362/240 |
| 2008/0273326 A1 * | 11/2008 | Wilcox | F21V 15/01 |
| | | | 362/249.01 |
| 2008/0285136 A1 | 11/2008 | Jacobowitz et al. | |
| 2008/0298056 A1 | 12/2008 | Petersen | |
| 2009/0109542 A1 | 4/2009 | Li et al. | |
| 2009/0159915 A1 | 6/2009 | Branchevsky | |
| 2009/0298376 A1 * | 12/2009 | Guillien | F21V 5/04 |
| | | | 445/43 |
| 2010/0002449 A1 | 1/2010 | Lin | |
| 2010/0014290 A1 * | 1/2010 | Wilcox | F21V 5/04 |
| | | | 362/244 |
| 2010/0163909 A1 | 7/2010 | Chen et al. | |
| 2010/0172135 A1 | 7/2010 | Holder et al. | |
| 2010/0207140 A1 | 8/2010 | Rudaz et al. | |
| 2010/0230693 A1 | 9/2010 | Tran | |
| 2010/0264432 A1 | 10/2010 | Liu et al. | |
| 2010/0271708 A1 | 10/2010 | Wilcox | |
| 2010/0271829 A1 | 10/2010 | LaPorte | |
| 2010/0308356 A1 | 12/2010 | Wirth | |
| 2011/0026247 A1 | 2/2011 | Zhang | |
| 2011/0063857 A1 | 3/2011 | Li et al. | |
| 2011/0069496 A1 | 3/2011 | Ing et al. | |
| 2011/0103051 A1 * | 5/2011 | Wilcox et al. | 362/235 |
| 2011/0110098 A1 | 5/2011 | Fu | |
| 2011/0157891 A1 * | 6/2011 | Davis et al. | 362/244 |
| 2011/0164425 A1 | 7/2011 | Chen | |
| 2011/0176301 A1 | 7/2011 | Liang et al. | |
| 2011/0242807 A1 * | 10/2011 | Little et al. | 362/235 |
| 2011/0267822 A1 | 11/2011 | Harbers et al. | |
| 2011/0280014 A1 * | 11/2011 | Householder et al. | 362/235 |
| 2011/0291548 A1 | 12/2011 | Nguyen The et al. | |
| 2011/0292658 A1 * | 12/2011 | Ho | 362/307 |
| 2011/0304269 A1 * | 12/2011 | Wang | F21K 9/00 |
| | | | 315/113 |
| 2012/0003343 A1 | 1/2012 | Armstrong et al. | |
| 2012/0014115 A1 * | 1/2012 | Park et al. | 362/311.02 |
| 2012/0051047 A1 | 3/2012 | Lu et al. | |
| 2012/0091487 A1 | 4/2012 | Chan et al. | |
| 2012/0126268 A1 * | 5/2012 | Seo et al. | 257/98 |
| 2012/0170280 A1 | 7/2012 | Choquet | |
| 2012/0201031 A1 | 8/2012 | Marley | |
| 2012/0281404 A1 | 11/2012 | Wilcox et al. | |
| 2012/0294011 A1 | 11/2012 | Cattoni et al. | |
| 2012/0307495 A1 | 12/2012 | Shih | |
| 2012/0307503 A1 | 12/2012 | Wilcox et al. | |
| 2012/0319592 A1 | 12/2012 | Riesebosch | |
| 2012/0319616 A1 | 12/2012 | Quilici et al. | |
| 2013/0148363 A1 | 6/2013 | Choquet et al. | |
| 2013/0194799 A1 * | 8/2013 | Wu | F21V 5/046 |
| | | | 362/240 |
| 2014/0029114 A1 * | 1/2014 | Kim | 359/709 |
| 2014/0126206 A1 | 5/2014 | Wilcox et al. | |
| 2014/0160724 A1 * | 6/2014 | Lerman | F21V 5/04 |
| | | | 362/84 |
| 2014/0268810 A1 | 9/2014 | Marquardt | |

FOREIGN PATENT DOCUMENTS

| | | |
|---|---|---|
| EP | 2495096 A2 | 9/2012 |
| JP | H0319818 | 1/1991 |
| JP | H03138147 | 6/1991 |
| JP | H03142207 | 6/1991 |

(56) References Cited

FOREIGN PATENT DOCUMENTS

| | | |
|---|---|---|
| JP | 2001191365 A | 7/2001 |
| WO | 2008076399 A2 | 6/2008 |
| WO | 10/095068 | 8/2010 |
| WO | 11/091529 | 8/2011 |
| WO | 2012132597 A1 | 10/2012 |
| WO | 2012147342 A1 | 11/2012 |

OTHER PUBLICATIONS

English Language Abstract of JP H03142207, Hiroshi et al., Jun. 19, 1991.
English Language Abstract of JP H0319818, Tatsu, Jan. 29, 1991.
English Language Abstract of DE 202014100462, Grunecker et al., Apr. 10, 2014.
English Language Abstract of JP H03138147, Akihiro et al., Jun. 12, 1991.
"Plastic Optics", William S. Beich, accessed from http://www.photonics.com/EDU/Handbook.aspx?AID=25487 on Nov. 3, 2015.

* cited by examiner

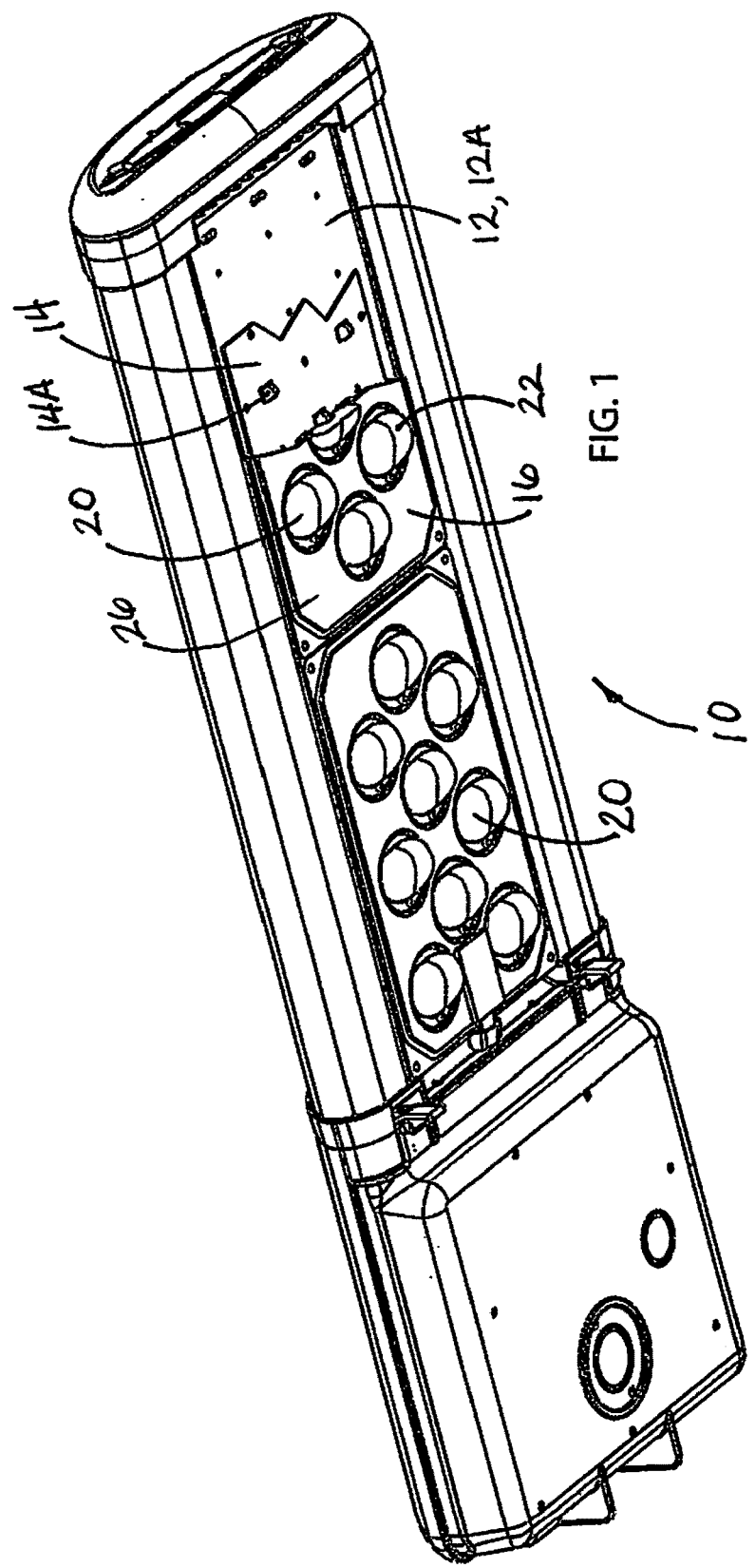

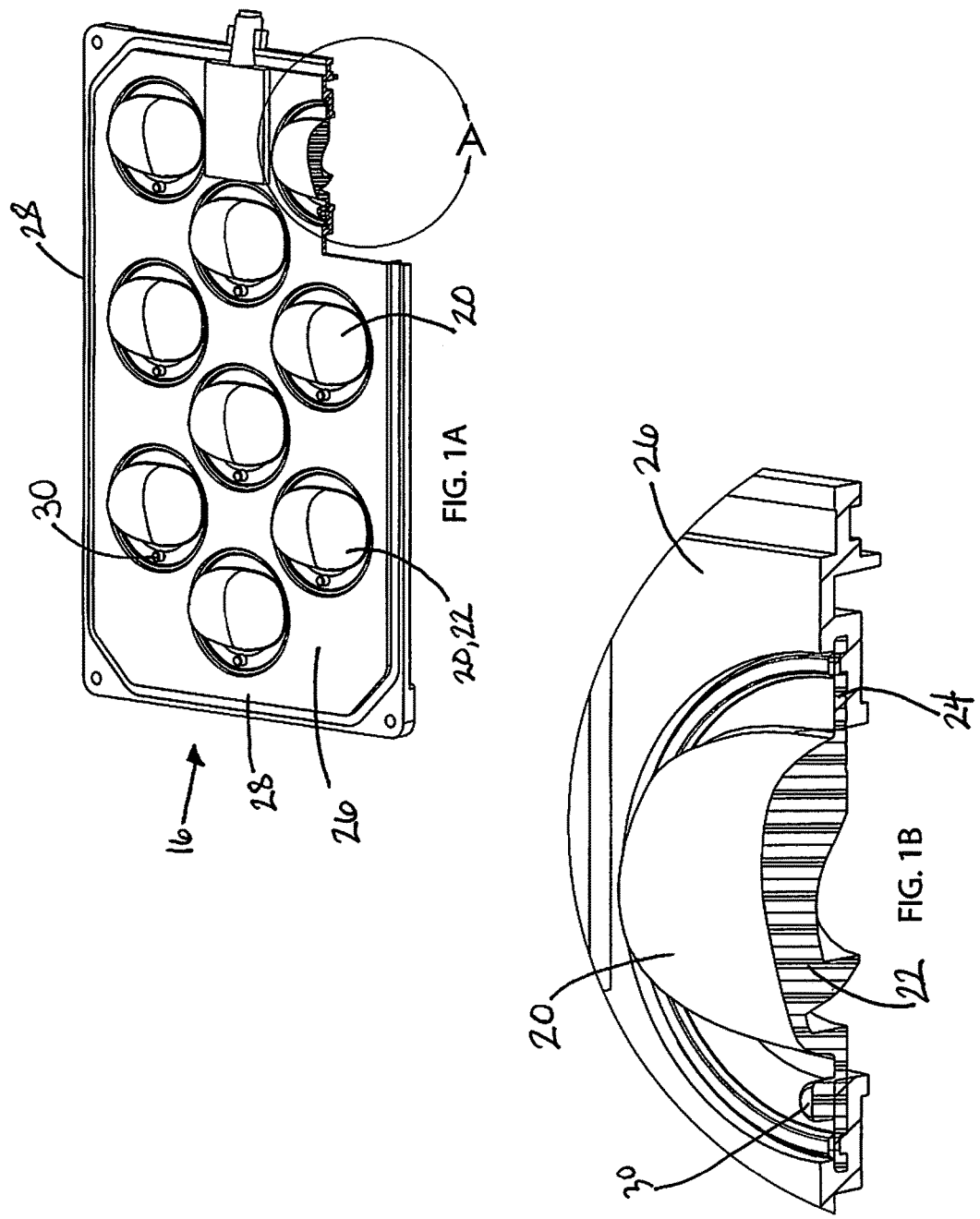

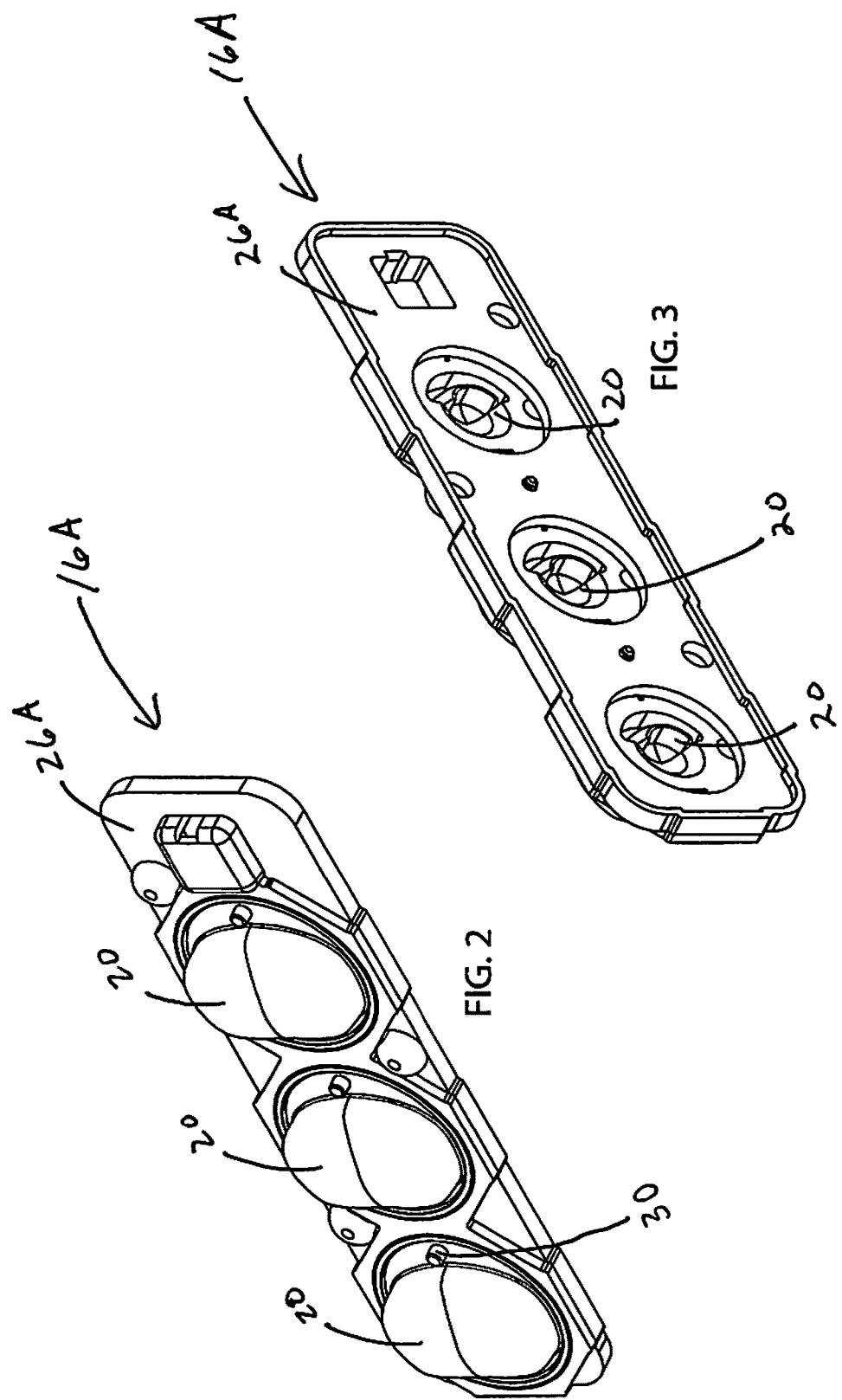

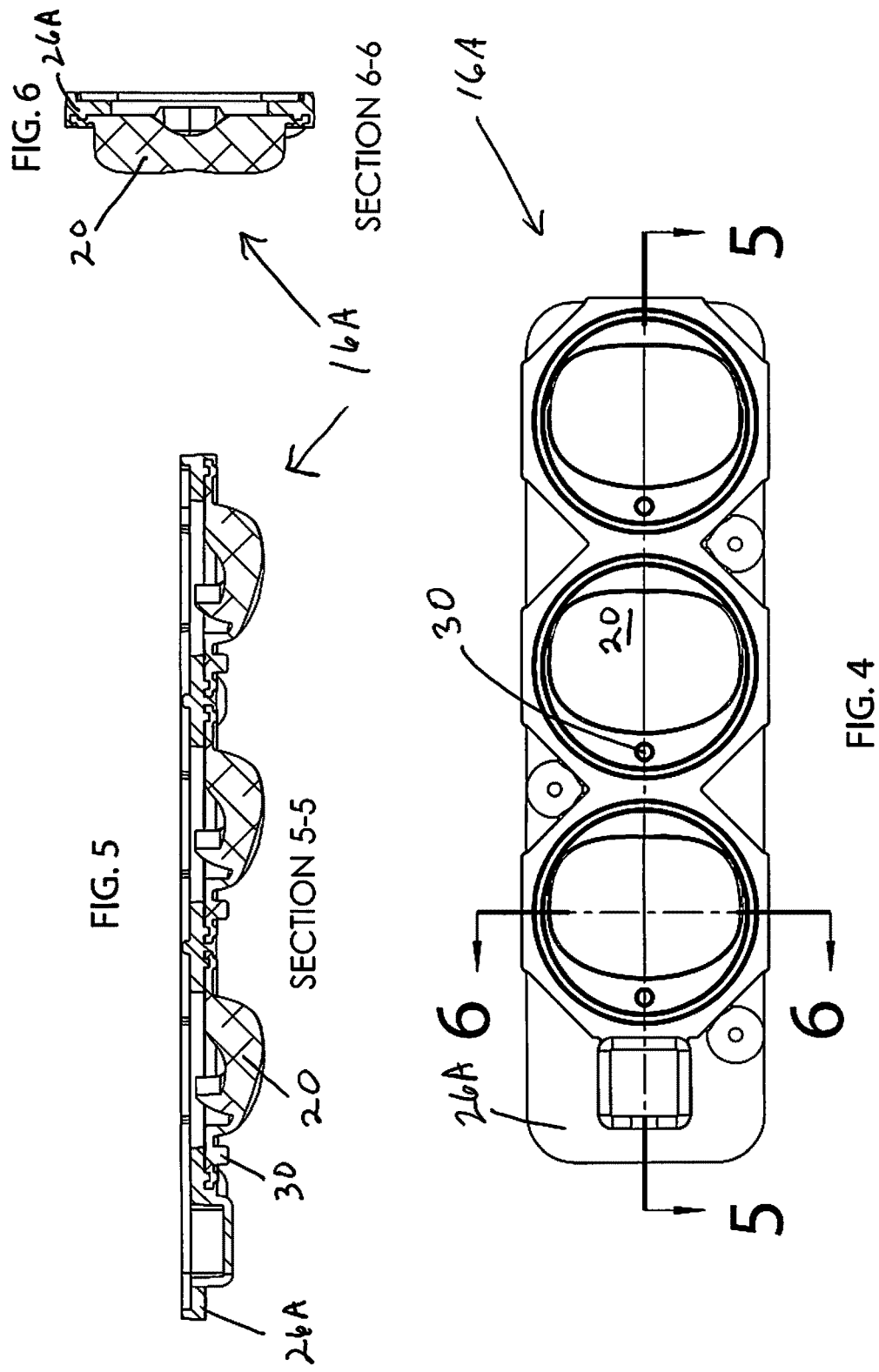

ONE-PIECE MULTI-LENS OPTICAL MEMBER AND METHOD OF MANUFACTURE

RELATED APPLICATIONS

This application is a continuation-in-part of currently pending U.S. application Ser. No. 13/441,571, filed on Apr. 6, 2012, which is a continuation-in-part of U.S. application Ser. No. 12/610,077, filed on Oct. 30, 2009, now U.S. Pat. No. 8,348,461, issued Jan. 8, 2013.

FIELD OF THE INVENTION

The invention relates generally to the field of LED (light emitting diode) light fixtures and, more particularly, to secondary lenses for such fixtures for directing light from LED light sources, and, still more particularly, to polymeric secondary lensing members for LED light fixtures.

BACKGROUND OF THE INVENTION

There is a need for lighting apparatus for a variety of general lighting purposes which is low-cost and energy-efficient. LED light sources are energy-efficient, and advances in LED technology are providing even greater efficiencies over time. One important aspect of LED light fixtures is the so-called secondary lensing that directs light received from LED light sources. As used herein, the term "LED light source" refers to an LED or a small grouping of LEDs alone, or more typically to what is referred to as an LED package—namely, an LED (or small grouping of LEDs) with what is referred to as a primary lens formed thereon. Secondary lenses, which receive and direct light from LED light sources, are of significant importance to LED light fixtures in many ways.

Secondary lenses play a major role, of course, in the direction of light from a light fixture, and so determine the degree and spread of illumination, and overall optical efficiency. The forming and shaping of secondary lenses are typically important considerations with respect to the usefulness of an LED fixture, and play a significant role in overall product cost. Improvements in secondary lensing members, their optical capabilities, and their manufacture are important considerations in the field of LED light fixtures.

LED light fixtures for a wide variety of both specific and general lighting applications typically have a plurality of LED light sources, usually positioned in spaced relationship to one another on a board (e.g., a circuit board), and a secondary lens is aligned with each LED light source. Such secondary lenses are in some cases part of a one-piece optical member that has a plurality of secondary lens portions each surrounded by and interconnected by a non-lens portion. Improvements in such multi-secondary-lens members, the optical capabilities of the secondary lens portions, and the manufacture of such members are important considerations in the field of LED light fixtures. More specifically, speed (and therefore cost) and accuracy of manufacture are particularly important considerations.

With the rapid development of high-performance LED lighting fixtures for a wide variety of general and specific lighting tasks and with the varying requirements for secondary lensing in such fixtures, there is a need for a system which enables quick and accurate manufacture of one-piece optical members each having different requirements for their secondary-lens portions.

It would be beneficial to provide secondary lensing, one-piece multi-lens optical members, and LED light fixtures which are low in cost as well as highly accurate in directing LED light, and which contribute to the overall economy and efficiency of LED light fixtures.

SUMMARY OF THE INVENTION

The present invention is an improved one-piece optical member, secondary lensing, and LED light fixtures with such secondary lensing, as well as a method of manufacturing such one-piece optical members. These address the above-noted needs, concerns and considerations and serve to improve product quality and efficiency and reduce manufacturing costs of high-performance LED light fixtures.

One aspect of this invention is an improved LED light fixture of the type including (a) a heat-sink structure having a mounting surface, (b) a circuit board that is on the mounting surface and has a plurality of LED light sources spaced thereon, and (c) a one-piece optical member over the circuit board and having a plurality of secondary lenses thereon each for alignment with a corresponding one of the light sources. In the improved LED light fixture, the one-piece optical member comprises: each of the lenses having at least one layer of a polymeric material, which polymeric material extends into a lens flange of such material that surrounds the lens and is spaced from the lens flanges that surround adjacent lenses; and a polymeric carrier portion surrounding the lenses, overlapping with and molded onto to the lens flanges across such overlapping, and extending laterally therefrom to a peripheral edge portion.

In certain embodiments, the at least one lens layer is of a first polymeric material and the carrier is of a second polymeric material. In some embodiments, the first polymeric material is an acrylic and the second polymeric material is a polycarbonate. In some other embodiments, the at least one lens layer and the carrier are of the same polymeric material.

In some embodiments, each lens has at least two layers of polymeric material. And, in some of such embodiments, at least two of the lens layers are of the same polymeric material—e.g., an acrylic.

In other embodiments, at least two of the lens layers are of the different polymeric materials. In some of such embodiments, one of the lens layers is an acrylic and at least one other lens layer is of a cured liquid silicone resin (LSR). In some of these embodiments, the lens layer of an LSR material is the innermost layer. Use of an LSR later as the innermost layer tends to allows excellent precision in the intended light-directing functions of the lens portions of the unitary optic member, even while providing time- and cost-related manufacturing advantages.

In certain embodiments of this invention, each of the lenses has three layers of polymeric material. The layers may be of the same polymeric material, or may be different. The innermost polymeric layer may be an LSR material.

In the multi-layer lenses in this invention, each lens defines a lens optical footprint and at least one of the layers in each lens may be less than coextensive with the lens optical footprint. As used herein, the term "lens optical footprint" means the largest light-passage area within the lens and orthogonal to the axis of the light source. In embodiments in which one of the layers is less than coextensive with the lens optical footprint cases, another of the layers may include a flange extending beyond the lens optical footprint.

Another aspect of this invention is a one-piece optical member of the type described above as a member of an LED light fixture.

Still another aspect of this invention is a method for manufacturing a one-piece optical member having plural spaced lenses. The method comprises the steps of: providing a plurality of lenses each of which has at least one layer of a polymeric material extending into a lens flange of such material that surrounds the lens; placing the plurality of lenses in spaced positions of a mold for injection molding; injection molding a polymeric carrier portion of the one-piece optical member such that the carrier portion surrounds the lenses, overlaps and is molded onto to the lens flanges across such overlapping, and extends laterally therefrom to a peripheral edge portion.

In some embodiments of the method, the lenses have at least one lens layer of a first polymeric material which material extends into the lens flanges and the carrier is of a second polymeric material. In some of such embodiments, the first polymeric material is an acrylic and the second polymeric material is a polycarbonate.

In some embodiments of the method, the step of providing a plurality of lenses further includes selecting lenses from a group of lenses having different optical properties. The group of lenses may include subgroups, flanged lenses of each subgroup having the same optical properties but with optical properties differing from group to group. The selecting steps may include selecting lenses all of which have the same optical properties.

In certain embodiments, the flanges of each of the lenses has an indexing feature and the step of placing the lenses in spaced positions further includes angularly orienting the lenses in the mold with the indexing features.

As used herein in referring to the optical member with its plurality of spaced, flanged secondary lenses, the term "one-piece" means that the portions of the carrier portion which surround the lenses and overlap the lens flanges are overmolded onto such lens flanges such that the layer-to-layer interface is bonded in the overmolding process; and, for those optical members of this invention for which the lenses have plural layers, the layer-to-layer interfaces are bonded in overmolding as well.

As used herein, the term "outermost layer" refers to the layer farthest from the LED light source, or at least the last layer through which light from such light source passes. And the term "innermost layer" refers to the layer closest to the LED light source, or at least the first layer through which light from such light source passes.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 1 is a perspective view of an LED light fixture having two one-piece optical members, such fixture and optical members being in accordance with this invention.

FIG. 1A is a perspective view of a one-piece optical member of the LED lighting fixture of FIG. 1.

FIG. 1B is an enlarged cross-sectional perspective view of one portion of the one-piece optical member of FIG. 1A, illustrating one secondary lens.

FIG. 2 is a perspective view of one such one-piece optical member, showing its light-output side.

FIG. 3 is a perspective view of such optical member, but showing its light-input side.

FIG. 4 is a plan view of such optical member.

FIG. 5 is a side sectional view taken along section 5-5 as indicated in FIG. 4.

FIG. 6 is an end sectional view taken along section 6-6 as indicated in FIG. 4.

DETAILED DESCRIPTION OF EXEMPLARY EMBODIMENTS

Figure 1C:
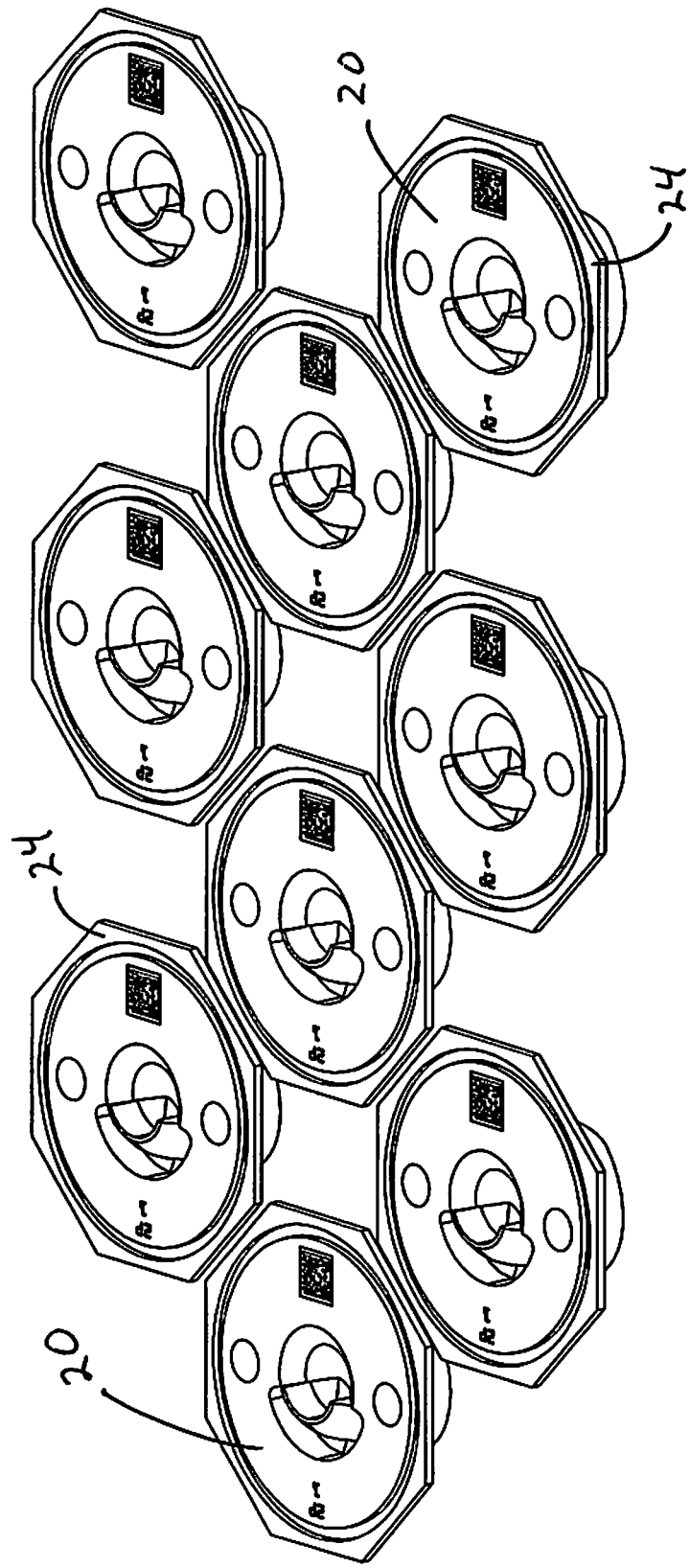
FIG. 1C is a perspective view illustrating the positioning of secondary lenses as placed in injection-molding apparatus. The injection-molding apparatus is not shown in FIG. 1C.

FIGS. 1 and 1A-1C illustrate an LED lighting fixture 10 in accordance with this invention. LED light fixture 10 includes a heat-sink structure 12 that has a mounting surface 12A on which a circuit board 14 is mounted. Circuit board 14 has a plurality of LED light sources 14A spaced thereon. A one-piece optical member 16 is positioned over circuit board 14 and has a plurality of secondary lenses 20 thereon, each for alignment with a corresponding one of light sources 14A.

In the improved LED light fixture, each of lenses 20 of one-piece optical member 16 has a layer 22 of polymeric material, which polymeric material extends into a lens flange 24 of such material that surrounds lens 20 and is spaced from lens flanges 24 that surround adjacent lenses 20. One-piece optical member 16 also has a polymeric carrier portion 26 surrounding lenses 20. Carrier portion 26 overlaps with and is molded onto to lens flanges 24 across such overlapping, and carrier portion 26 extends laterally therefrom to a peripheral edge portion 28. FIG. 1B best illustrates the above-described characteristics.

The polymeric material of lens 20, i.e., the material of outer layer 22 and flange 24, is an acrylic, while the polymeric material of carrier portion 26 is a polycarbonate. A wide variety of optical-grade acrylics can be used, and are available from various sources, including: Mitsubishe Rayon America, Inc.; Arkema Group; and Evonik Cyro LLC. Likewise, a wide variety of polycarbonate materials can be used, and are available from various sources, such as Bayer and Sabic.

FIG. 1C illustrates the positioning of secondary lenses 20 as placed in the injection-molding apparatus (not shown). After such placement, carrier portion 26 is injection molded onto lens flanges 24 to form one-piece optical member 16. As already indicated, carrier portion 26 surrounds lenses 20 and overlaps and is molded onto to lens flanges 24.

FIGS. 2-7 illustrate aspects of an alternative one-piece optical member 16A which has three lenses 20 and a carrier portion 26A. The only significant difference between one-piece optical members 16 and 16A is the number of lenses.

Figure 7:
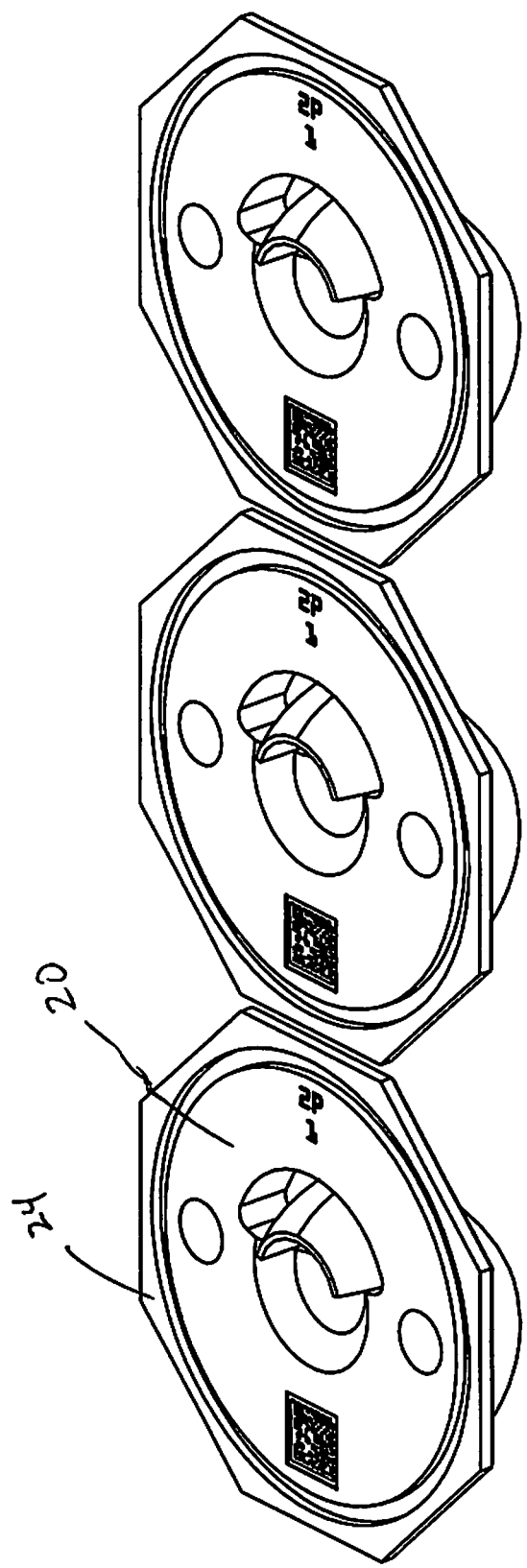
FIG. 7 is an enlarged perspective view of the three individual lenses of the one-piece optical member arranged as they would be in a mold prior to the polymeric carrier portion being injection molded onto the lens flanges, to complete the one-piece optical member.

FIG. 7, as with FIG. 1C, illustrates the positioning of secondary lenses 20 as placed in the injection-molding apparatus. Accurate placement into the injection-molding apparatus is facilitated by indexing features in the form of posts 30 (see FIGS. 2, 4 and 5) which extend from lens flange 24 and mate with corresponding recesses in the mold. (FIGS. 1A and 1B also show such indexing feature.)

Figure 8:
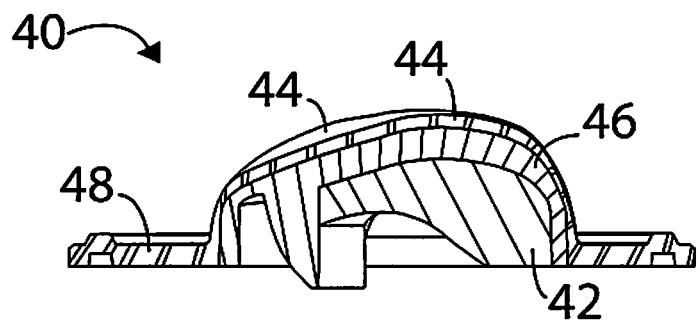
FIG. 8 is a central cross-sectional view of the lens of an alternative embodiment, such alternative lens having three layers.
Figure 9:
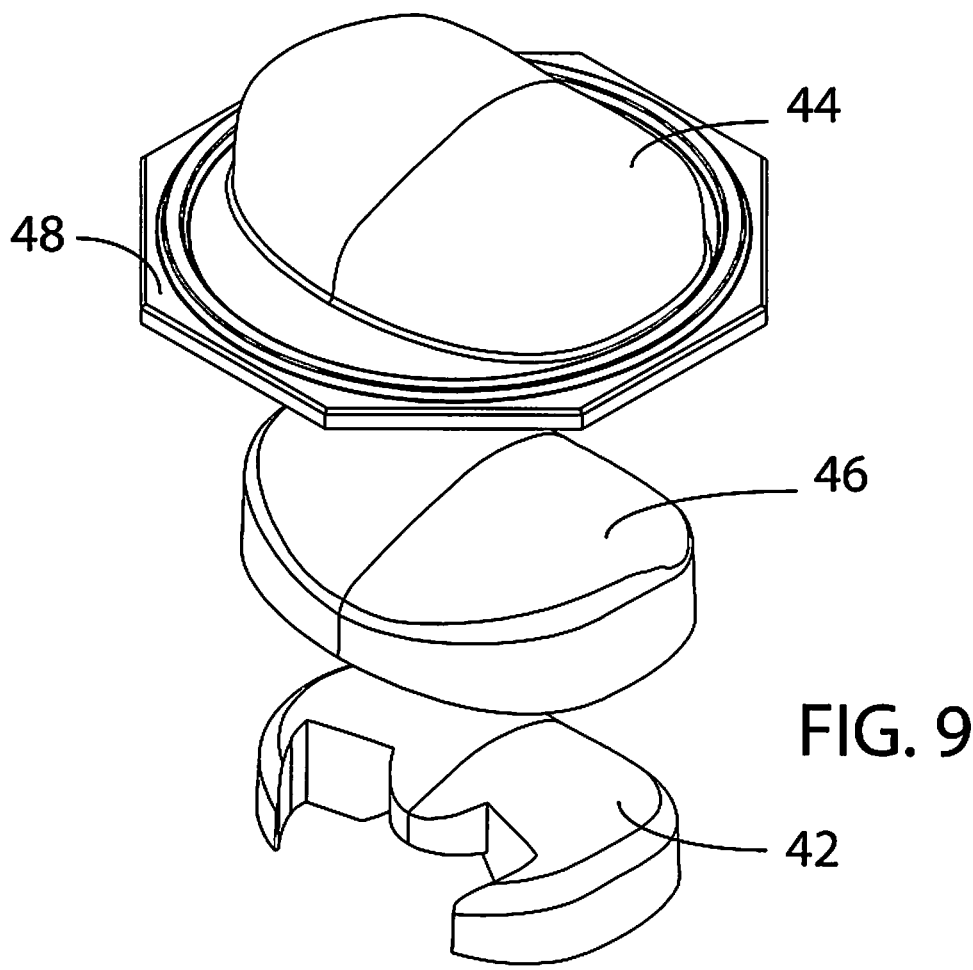
FIG. 9 is an exploded perspective view of the lens of FIG. 18, serving to illustrate the shapes of the layers of such lens.

FIGS. 8 and 9 illustrate an alternative lens 40 which is a multi-layer lens. Lens 40 has three layers, including an innermost layer 42, an outermost layer 44, and an intermediate layer 46. The layer shapes are illustrated in the FIG. 14 exploded view. As seen well in FIGS. 8 and 9, lens 40 has an optical footprint, referred to above, and innermost layer 42 is less than coextensive with the lens optical footprint. Outermost layer 44 of lens 40 includes a flange 48 extending beyond the optical footprint of lens 40.

The layers of each pair of adjacent layers of lens 40 are joined together permanently at their interface by overmolding. Lens 40 may be formed by a series of injection-molding steps. For example, innermost layer 42 is first formed by injection molding. Then, at the next injection-molding station, intermediate layer 46 is overmolded with innermost layer 42. And then, at a third injection-molding station, outermost layer 44 is overmolded onto the previously overmolded layers.

The layers of lens 40 may be of the same or differing polymeric materials. And injection-moldable materials may be chosen having different indices of refraction. One or more of the lens layers may be an acrylic and at least one other lens layer may be of an LSR material. In particular, the innermost lens layer may be an LSR material.

While the principles of this invention have been described in connection with specific embodiments, it should be understood clearly that these descriptions are made only by way of example and are not intended to limit the scope of the invention.

The invention claimed is:

1. An LED light fixture comprising:
   a heat-sink structure having a mounting surface supporting a circuit board with a plurality of spaced apart LED light sources on the circuit board; and
   a one-piece optical member over the circuit board and having a carrier portion and a plurality of lenses each with an outward lens flange surrounding a light-transmitting portion which is formed by a plurality of layers and has an asymmetric inner surface defining a pair of cavities with at least one of the plurality of layers at least partially extending between the pair of cavities, a portion of the inner-surface which defines one of the cavities is at least partially formed by another of the plurality of layers which is bonded to the at least one layer extending between the pair of cavities, the carrier portion at least partially overlapping the outward flange of each of the lenses.

2. The LED light fixture of claim 1 wherein:
   each of the lenses has at least one lens layer of a first polymeric material extending into the lens flange; and
   the carrier is of a second polymeric material.

3. The LED light fixture of claim 2 wherein the first polymeric material is an acrylic and the second polymeric material is a polycarbonate.

4. The LED light fixture of claim 1 wherein the carrier portion is bonded to the lens flanges across overlapping.

5. The LED light fixture of claim 1 wherein at least two of the lens layers are of the same polymeric material.

6. The LED light fixture of claim 5 wherein the at least two lens layers are of an acrylic.

7. The LED light fixture of claim 1 wherein at least two of the lens layers are of different polymeric materials.

8. The LED light fixture of claim 7 wherein one of the lens layers is an acrylic and at least one other lens layer is of an LSR material.

9. The LED light fixture of claim 1 wherein each of the lenses has three layers of polymeric material.

10. The LED light fixture of claim 9 wherein the three layers are of the same polymeric material.

11. The LED light fixture of claim 9 wherein an innermost polymeric layer is of an LSR material.

12. The LED light fixture of claim 1 wherein the flange is formed by a lens layer forming an outer lens surface.

13. A one-piece optical member comprising:
   a plurality of spaced lenses positionable over light sources on a circuit board, each of the lenses having an outward flange surrounding a light-transmitting portion which is formed by a plurality of layers and has an asymmetric inner lens surface defining a pair of cavities with at least one of the plurality of layers at least partially extending inwardly between the pair of cavities, a portion of the inner-surface which defines one of the cavities is at least partially formed by another of the plurality of layers which is bonded to the at least one layer extending between the pair of cavities; and
   a carrier portion bonded to at least a portion of the flange of each of the lenses.

14. The one-piece optical member of claim 13 wherein:
   each of the lenses has at least one lens layer of a first polymeric material which extends into the lens flange; and
   the carrier is of a second polymeric material.

15. The one-piece optical member of claim 14 wherein the first polymeric material is an acrylic and the second polymeric material is a polycarbonate.

16. The one-piece optical member of claim 13 wherein the carrier portion is bonded to at least a portion of each of an innermost flange surface facing the circuit board and an opposite outermost flange surface of each lens.

17. The one-piece optical member of claim 13 wherein at least two of the lens layers are of the same polymeric material.

18. The one-piece optical member of claim 17 wherein the at least two lens layers are of an acrylic.

19. The one-piece optical member of claim 13 wherein at least two of the lens layers are of different polymeric materials.

20. The one-piece optical member of claim 19 wherein one of the lens layers is an acrylic and at least one other lens layer is of an LSR material.

21. The one-piece optical member of claim 20 wherein the lens layer of an LSR material is an innermost layer.

22. A method for manufacturing a one-piece optical member having a plurality of spaced lenses positionable over light sources on a circuit board, the method comprising the steps of:
   providing a plurality of lenses each having a light-transmitting portion surrounded by an outward lens flange, the light-transmitting portion which has an asymmetric inner lens surface defining a pair of cavities with at least one of the plurality of layers at least partially extending between the pair of cavities, a portion of the inner-surface which defines one of the cavities is at least partially formed by another of the plurality of layers which is bonded to the at least one layer extending between the pair of cavities; and bonding a polymeric carrier portion to at least a portion of the flange of each of the plurality of the lenses such that the carrier portion surrounds each of the lenses.

23. The method of claim 22 wherein the step of bonding includes the steps of:
placing the plurality of lenses in a mold; and
injection molding the polymeric carrier portion onto the lens flanges.

24. The method of claim 23 wherein each of the lens flanges has an indexing feature and the placing of the lenses in spaced positions further includes angularly orienting the lenses in the mold with the indexing features.

25. The method of claim 22 wherein:
each of the lenses has at least one lens layer of a first polymeric material; and
the carrier is of a second polymeric material.

26. The method of claim 22 wherein the step of providing a plurality of lenses further includes the step of selecting lenses with particular optical properties.

27. The method of claim 26 wherein all of the selected lenses have the same optical properties.

\* \* \* \* \*